(12) United States Patent
Frieder et al.

(10) Patent No.: US 12,067,021 B2
(45) Date of Patent: Aug. 20, 2024

(54) CACHING HISTORICAL EMBEDDINGS IN CONVERSATIONAL SEARCH

(71) Applicant: Georgetown University, Washington, DC (US)

(72) Inventors: Ophir Frieder, Chevy Chase, MD (US); Ida Mele, Latina (IT); Christina-Ioana Muntean, San Giuliano Terme (IT); Franco Maria Nardini, Portoferraio (IT); Raffaele Perego, Pisa (IT); Nicola Tonellotto, Pisa (IT)

(73) Assignee: Georgetown University, Washington, DC (US)

( * ) Notice: Subject to any disclaimer, the term of this patent is extended or adjusted under 35 U.S.C. 154(b) by 0 days.

(21) Appl. No.: 18/172,099

(22) Filed: Feb. 21, 2023

(65) Prior Publication Data
US 2023/0267126 A1 Aug. 24, 2023

Related U.S. Application Data

(60) Provisional application No. 63/313,069, filed on Feb. 23, 2022.

(51) Int. Cl.
*G06F 16/2457* (2019.01)
*G06F 16/242* (2019.01)

(52) U.S. Cl.
CPC ...... *G06F 16/24578* (2019.01); *G06F 16/243* (2019.01)

(58) Field of Classification Search
CPC ............. G06F 16/24578; G06F 16/243; G06F 16/3349; G10L 15/22
See application file for complete search history.

(56) References Cited

U.S. PATENT DOCUMENTS

| | | | |
|---|---|---|---|
| 2017/0092264 A1* | 3/2017 | Hakkani-Tur | G10L 15/16 |
| 2020/0311683 A1* | 10/2020 | Chua | G06F 18/22 |
| 2022/0100358 A1* | 3/2022 | Tobias | G06Q 50/184 |
| 2022/0172713 A1* | 6/2022 | Kwatra | G10L 15/26 |
| 2022/0230629 A1* | 7/2022 | Zhu | G06F 40/279 |

* cited by examiner

*Primary Examiner* — Mariela Reyes
*Assistant Examiner* — Fatima P Mina
(74) *Attorney, Agent, or Firm* — Smith Gambrell & Russel LLP

(57) ABSTRACT

A method and system are described for improving the speed and efficiency of obtaining conversational search results. A user may speak a phrase to perform a conversational search or a series of phrases to perform a series of searches. These spoken phrases may be enriched by context and then converted into a query embedding. A similarity between the query embedding and document embeddings is used to determine the search results including a query cutoff number of documents and a cache cutoff number of documents. A second search phrase may use the cache of documents along with comparisons of the returned documents and the first query embedding to determine the quality of the cache for responding to the second search query. If the results are high-quality then the search may proceed much more rapidly by applying the second query only to the cached documents rather than to the server.

16 Claims, 8 Drawing Sheets

Process 1: The CACHE pseudo-code

Input : a metric index $\mathcal{M}$, a metric cache $\mathcal{C}$, a query cutoff $k$, a cache cutoff $k_c$, a query embedding $\psi$

Output : a results set $\mathcal{R}$

1    if Empty($\mathcal{C}$) or LowQuality($\psi$, $\mathcal{C}$) then
2       $\mathcal{R} \leftarrow \text{NN}(M, \psi, k_c)$
3       Insert($\mathcal{C}$, $\mathcal{R}$)
4    $\mathcal{R} \leftarrow \text{NN}(\mathcal{C}, \psi, k)$
5    return R

FIG. 4

CACHING HISTORICAL EMBEDDINGS IN CONVERSATIONAL SEARCH

CROSS-REFERENCE TO RELATED PATENT APPLICATION

The present patent application claims priority to U.S. Provisional Patent Application No. 63/313,069, filed on Feb. 23, 2022, and entitled "Caching Historical Embeddings in Conversational Search," the disclosure of which is incorporated in its entirety herein by reference thereto.

BACKGROUND OF THE INVENTION

The present invention relates to conversational search.

Conversational agents, fueled by language understanding advancements enabled by large contextualized language models, can help people perform electronic searches. Multi-turn conversations commence with a main topic and evolve with differing facets of the initial topic or an abrupt shift to a new focus, possibly suggested by the content of the answers returned.

Traditionally, searches have involved keywords only and lacked any inherent understanding of human language. Many searches at the present time originate not from a keyboard but from an audio input device, such as a smart speaker. In this context, the use of human language to direct a query is important. When searching using keywords and lacking context, the search engine must compare whether each document or website contains the keywords. Since many searches now originate from a smart speaker or other device which can detect audio and understand the basics of human language, the time to perform a search can be reduced by considering previous searches performed and also by taking into account the context.

Accordingly, a need arises for techniques that provide a fast and effective way to perform searches which take into account the context of the search query and the results of the previous searches.

SUMMARY OF THE INVENTION

Aspects of the disclosure relate to systems and methods for improving the efficiency and speed of a conversational search.

In an embodiment, a method is described for improving the speed and efficiency of conversational search. The method receives a first utterance at a server and may convert the first utterance into a first query in an embedding space. Then the method performs a first conversational search on a remote server by comparing a first similarity of the first query with an embedding of each document of a plurality of documents. The method then returns a cache cutoff number of documents ranked by the first similarity and a query cutoff number of documents also ranked by the first similarity. (Note that in most instances the cache cutoff number of documents ($k_c$) is much greater than the query cutoff number of documents (k)). The first query and the cache cutoff number of documents ranked by the first similarity are stored in a cache on a local device. The method then may receive a second utterance to perform a second conversational search and convert the second utterance into a second query also in the embedding space. The method may then determine, at the local device, using the second query and the cache, whether the second query applied to the cache documents provides low- or high-quality results. If the second query applied to the cache produces low-quality results, then a second conversational search may be performed at the server by calculating a second similarity between the second query and an embedding of each document of the plurality of documents and returning the query cutoff number of documents ranked by the second similarity. If the second query applied to the cache provides high quality results, then the second conversational search is performed at the local device on the cache by calculating a second similarity of the second query with an embedding of each document of the cache and returning the query cutoff number of documents ranked by the second similarity. Then the method may report the search results to the local device. The search results may comprise the query cutoff number of documents ranked by the first similarity from the first conversational search and the query cutoff number of documents ranked by a second similarity from the second conversational search.

In an embodiment, the cache cutoff number is much greater than the query cutoff number. In an embodiment, the first utterance and the second utterance may be semantically enriched by context before being converted into the first query and the second query. In an embodiment, determining whether the second query applied to the cache provides low or high-quality results comprises determining two distances in embedding space and comparing the two distances. A query distance in embedding space is determined between the first query and the second query. A search distance in embedding space is determined between the first query and the least similar document of the returned cache cutoff number of documents from the first conversational search. If the query distance is less than or equal to the search distance, then the second query applied to the cache provides high-quality results. If the query distance is greater than the search distance, then the second query applied to the cache provides low-quality results.

In an embodiment, the distance comparison may be modified to include a hyperparameter. When the hyperparameter is included, the comparison is between the search distance and the query distance plus the hyperparameter rather than the query distance by itself. Thus, if the query distance plus the hyperparameter is less than or equal to the search distance, then the second query applied to the cache provides high-quality results. If the query distance plus the hyperparameter is greater than the search distance, then the second query applied to the cache provides low-quality results. The hyperparameter may be selected based on user preference.

In an embodiment, the method may be optimized taking into account at least one of the following evaluation metrics: a hit rate, an average query response time, a mean average precision at query cutoff 200, a mean reciprocal rank at query cutoff 200, a normalized discounted cumulative gain at query cutoff 3, a precision at query cutoff 1, a precision at query cutoff 3, a coverage of a query with respect to the local cache and the query cutoff number, and similar such measures as known in the art.

In an embodiment, a system is described for improving the speed and efficiency of conversational search. The system comprises a server and a local device. The local device receives a first utterance and a second utterance and transmits the first utterance and the second utterance to the server. The server and the local device perform a method. The server may convert the first utterance into a first query in an embedding space. The server performs a first conversational search on a remote server by comparing a first similarity of the first query with an embedding of each document of a plurality of documents. The server then returns a cache cutoff number of documents ranked by the first similarity and a query cutoff number of documents also ranked by the first similarity. (Note that in most instances the cache cutoff number of documents ($k_c$) is much greater than the query cutoff number of documents (k)). The first query and the cache cutoff number of documents ranked by the first similarity are stored in a cache on the local device. The second utterance may be converted into a second query in the embedding space. The local device may then determine using the second query and the cache whether the second query applied to the cache documents provides low or high-quality results. If the second query applied to the cache produces low-quality results, then a second conversational search may be performed at the sever by calculating a second similarity between the second query and an embedding of each document of the plurality of documents and returning the query cutoff number of documents ranked by the second similarity. If the second query applied to the cache provides high-quality results, then the second conversational search is performed at the local device on the cache by calculating a second similarity of the second query with an embedding of each document of the cache and returning the query cutoff number of documents ranked by the second similarity. Then the local device may report the search results. The search results may comprise the query cutoff number of documents ranked by the first similarity from the first conversational search and the query cutoff number of documents ranked by a second similarity from the second conversational search.

In an embodiment, the cache cutoff number is much greater than the query cutoff number. In an embodiment, the first utterance and the second utterance may be semantically enriched by context before being converted into the first query and the second query. In an embodiment, determining whether the second query applied to the cache provides low or high-quality results comprises determining two distances in embedding space and comparing the two distances. A query distance in embedding space is determined between the first query and the second query. A search distance in embedding space is determined between the first query and the least similar document of the returned cache cutoff number of documents from the first conversational search. If the query distance is less than or equal to the search distance, then the second query applied to the cache provides high quality results. If the query distance is greater than the search distance, then the second query applied to the cache provides low quality results.

In an embodiment, the distance comparison may be modified to include a hyperparameter. When the hyperparameter is included, then the comparison is between search distance and the query distance plus the hyperparameter rather than the query distance by itself. Thus, if the query distance plus the hyperparameter is less than or equal to the search distance, then the second query applied to the cache provides high quality results. If the query distance plus the hyperparameter is greater than the search distance, then the second query applied to the cache provides low-quality results. The hyperparameter may be selected based on user preference.

In an embodiment, the system may be optimized taking into account at least one of the following evaluation metrics: a hit rate, an average query response time, a mean average precision at query cutoff 200, a mean reciprocal rank at query cutoff 200, a normalized discounted cumulative gain at query cutoff 3, a precision at query cutoff 1, a precision at query cutoff 3, a coverage of a query with respect to the local cache and the query cutoff number, and similar such measures as known in the art.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention, and the invention may admit to other equally effective embodiments.

FIG. 4 illustrates an example of the CACHE method in pseudo-code

Other features of the present embodiments will be apparent from the Detailed Description that follows.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

The present disclosure relates to improving the efficiency and speed of performing a search query of a set of documents by including human language context and by including documents retrieved from prior search queries.

Figure 1:
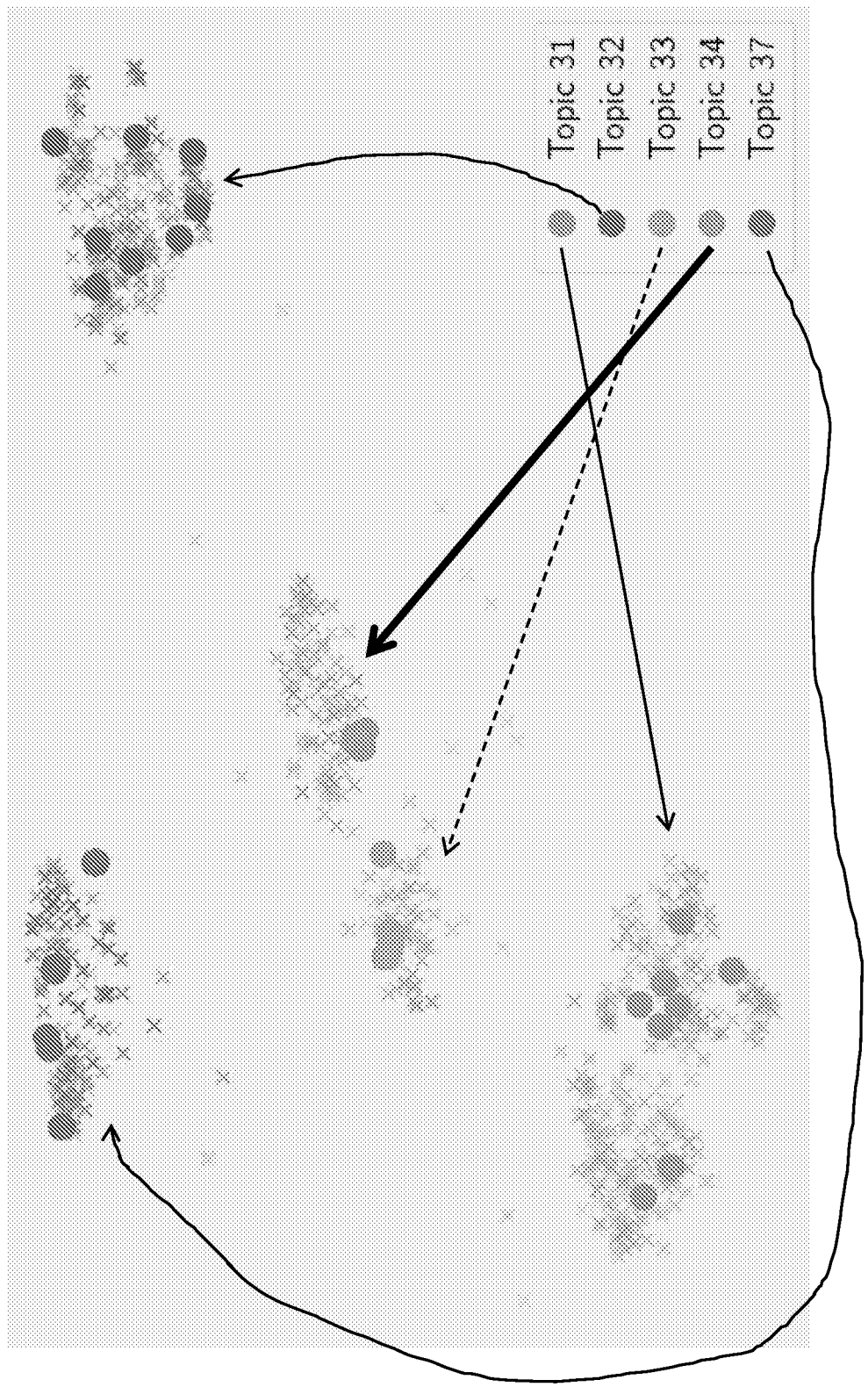
FIG. 1 illustrates a visualization of conversational queries and relevant documents.

A user drives an interactive information-discovery process by submitting a query about a topic followed by a sequence of more specific queries, possibly aimed at clarifying some aspects of the topic. Documents relevant to the first query are often relevant and helpful in answering subsequent queries. This observation suggests the presence of temporal locality in the lists of results retrieved by conversational systems for successive queries issued by the same user in the same conversation. FIG. 1 illustrates a t-SNE bi-dimensional visualization of dense representations for the queries and the relevant documents of five manually rewritten conversations from the Text Retrieval Conference 2019 Conversational Assistance Track dataset (TREC 2019 CAsT dataset). As illustrated, there is a clear spatial clustering among queries in the same conversation, as well as a clear spatial clustering of relevant documents for these queries.

The locality may be exploited to improve efficiency in conversational systems by caching the query results on the client side. Rather than caching pages of results answering queries likely to be resubmitted, the documents are cached about a topic, as their content will likely be likewise relevant to successive queries issued by the user involved in the conversation.

Topic caching effectiveness rests on topical locality. Specifically, if the variety of search domains is limited, the likelihood that past, and hence potentially cached, documents are relevant to successive searches is greater.

To capitalize on the deep semantic relationship between conversation queries and documents, recent advances in Dense Retrieval (DR) models are leveraged. In the DR setting, documents are represented by low-dimension learned embeddings stored for efficient access in a specialized metric index, such as that provided by the FAISS toolkit. Given a query embedded in the same multi-dimensional space, online ranking is performed by means of a top-k nearest neighbor similarity search based on a metric distance. In the worst-case scenario, the computational cost of the nearest neighbor search is directly proportional to the number of documents stored in the metric index. To improve the end-to-end responsiveness of the system, a client-side metric cache is inserted in front of the DR system to reuse documents retrieved for previous queries in the same conversation. Different strategies are investigated for populating the cache at cold start and updating its content as the conversation topic evolves.

The metric cache returns an approximate result set for the current query. Using reproducible experiments based on TREC CAsT datasets, it is demonstrated that the cache significantly reduces end-to-end conversational system processing times without answer quality degradation. Typically, a query is answered without accessing the document index since the cache already stores the most similar documents. More importantly, the quality of the documents present in the cache for the current query can be estimated. Based on this estimate, it is possible to decide if querying the document index is potentially beneficial. Depending on the size of the cache, the hit rate measured on the CAsT conversations varies between 65% and 75%, illustrating that caching significantly expedites conversational search by drastically reducing the number of queries submitted to the document index on the back-end.

The advances relative to the current state-of-the-art include:

Capitalizing on temporal locality, a client-side document embedding cache C is proposed for expediting conversational search systems;

Means are innovated that assess current cache content quality necessitating document index access only needed to improve response quality;

Using the TREC CAsT datasets, an improvement in responsiveness is demonstrated without accuracy degradation.

A conversational search system architecture is introduced and the proposed document embedding cache and the associated update strategies are discussed.

Figure 2:
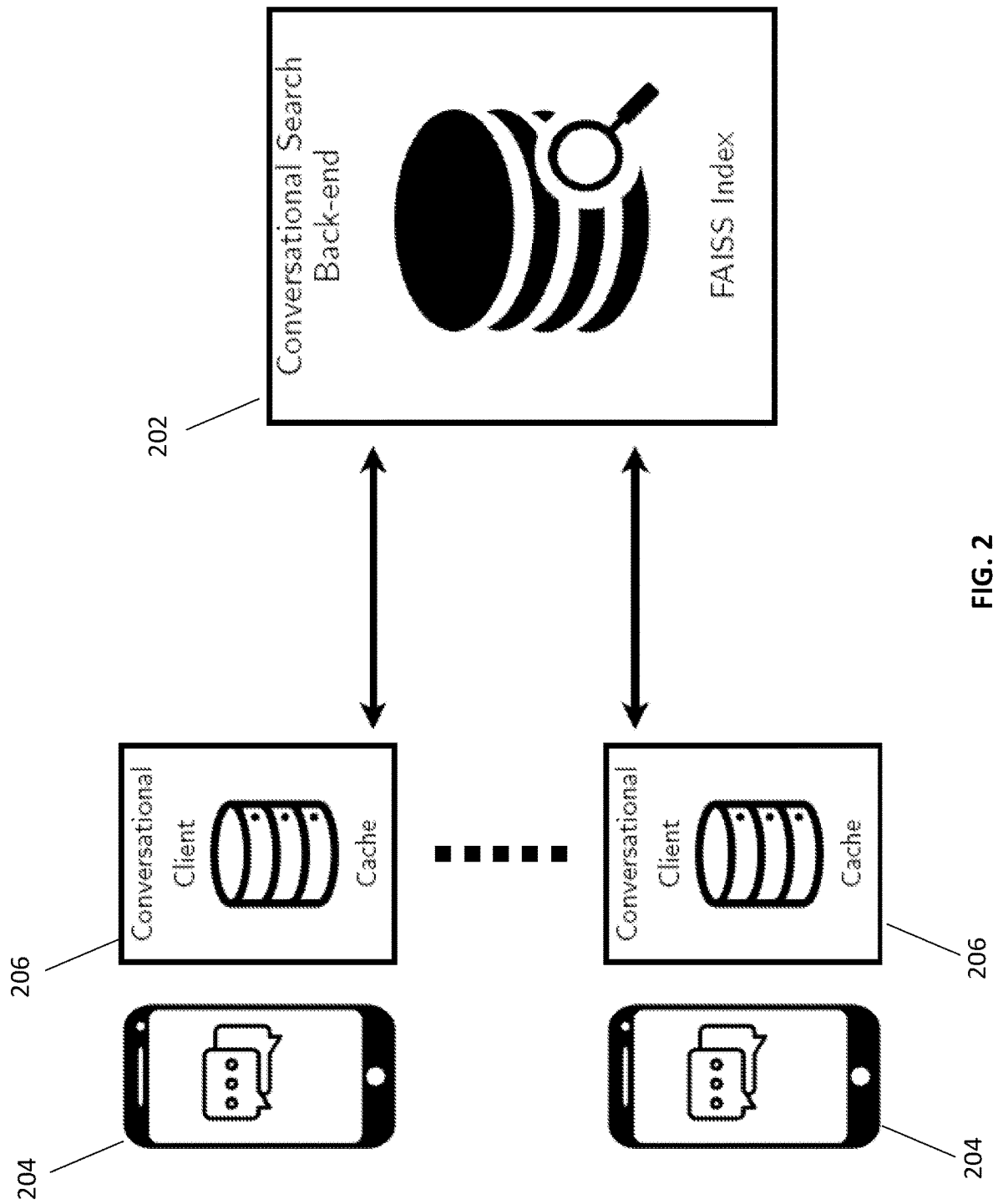
FIG. 2 illustrates an exemplary architecture of a conversational search system with client-side caching.

A conversational search system enriched with client-side caching is depicted in FIG. 2. A typical client-server architecture is adopted where a client supervises the conversational dialogue between a user (or a user's device) and a search back-end running on a remote server 202. A user's device 204 (e.g., a mobile phone, a smart speaker, PC, etc) may maintain a cache 206 on the local device 204. This cache may comprise recent search queries and also an index of documents found in recent searches and the embeddings of the documents found in recent queries.

It is assumed that the conversational back-end uses a dense retrieval model where documents and queries are both encoded with vector representations, also known as embeddings, in the same multi-dimensional latent space; the collection of document embeddings is stored, for efficient access, in a search system supporting nearest neighbor search, such as a FAISS index. Each conversational client, possibly running on a mobile device, deals with a single user conversation at a time, and hosts a local cache aimed at reusing, for efficiency reasons, the documents previously retrieved from the back-end as a result of the previous utterances of the ongoing conversation. Reusing previously retrieved results, namely cached results, eliminates the additional index access, reducing latency and resource load. Specifically, the twofold goal of the cache is: 1) to improve user-perceived responsiveness of the system by promptly answering user utterances with locally cached content; 2) to reduce the computational load on the back-end server by lowering the number of server requests as compared to an analogous solution not adopting client-side caching.

In an embodiment, the client may handle the user conversation by semantically enriching those utterances that lack context and by encoding the rewritten utterance in the embedding space. Online conversational search is performed in the above settings using the top k nearest neighbor queries based on a metric distance between the embedding of the utterance and those of the indexed documents. The conversational client likewise queries the local cache or the back-end for the most relevant results answering the current utterance and presents them to the requesting user. The first query of a conversation is always answered by querying the back-end index, and the results retrieved are used to populate the initially empty cache. For successive utterances of the same conversation, the decision of whether to answer by leveraging the content of the cache or querying the remote index is taken locally as explained later. The notation used is introduced, continuing with a mathematical background on the metric properties of queries and documents, and with a detailed specification of the client-side cache together with an update policy based on the metric properties of query and document embeddings.

Preliminaries

Each query or document is represented by a vector in $\mathbb{R}^l$, hereinafter called an embedding. Let $\mathcal{D} = \{d_1, d_2, \ldots, d_n\}$ be a collection of n documents represented by the embeddings $\Phi = \{\phi_1, \phi_2, \ldots, \phi_n\}$, where $\phi_i = \mathcal{L}(d_i)$ and $\mathcal{L}: \mathcal{D} \to \mathbb{R}^l$ is a learned representation function. Similarly, let $q_a$ be a query represented by the embedding $\psi_a = \mathcal{L}(q_a)$ in the same multi-dimensional space $\mathbb{R}^l$.

Similarly, functions to compare embeddings exist, including inner product and Euclidean norm. STAR is used to encode queries and documents. Since STAR embeddings are fine-tuned for maximal inner-product search, they cannot natively exploit the plethora of efficient algorithms developed for searching in Euclidean metric spaces.

To leverage nearest neighbor search and all the efficient tools devised for it, maximum inner product similarity search between embeddings can be adapted to use the Euclidean distance. Reliance on other distance measures known in the art is likewise within the scope of this invention. Given a query embedding $\psi_a \in \mathbb{R}^l$ and a set of document embeddings $\Phi = \{\phi_i\}$ with $\phi_i \in \mathbb{R}^l$, the following transformation is applied from $\mathbb{R}^l$ to $\mathbb{R}^{l+1}$ $$\bar{\psi}_a = [\psi_a^T / \|\psi_a\| | 0]^T, \bar{\phi}_i = [\phi_i^T / M | \sqrt{1 - \|\phi_i\|^2 / M^2}]^T \quad \text{Eq. 1}$$

where $M=\max_i \|\phi_i\|$. In doing so, the maximization problem of the inner product $\langle \psi_a, \phi_i \rangle$ becomes exactly equivalent to the minimization problem of the Euclidean distance $\|\overline{\psi}_a - \overline{\phi}_i\|$. In fact, it can be shown explicitly that:

$$\min\|\overline{\psi}_a - \overline{\phi}_i\|^2 = \min(\|\overline{\psi}_a\|^2 + \|\overline{\phi}_i\|^2 - 2\langle \overline{\psi}_a, \overline{\phi}_i \rangle) =$$
$$\min(2 - 2\langle \overline{\psi}_a, \overline{\phi}_i/M \rangle) = \max \langle \psi_a, \phi_i \rangle \qquad \text{Eq. 1b}$$

Hence, hereinafter the task of online ranking is considered with a dense retriever as a nearest neighbor search task based on the Euclidean distance among the transformed embeddings $\overline{\psi}$ and $\overline{\phi}$ in $\mathbb{R}^{l+1}$. Intuitively, assuming l=2, the transformation (1) maps arbitrary query and document vectors in $\mathbb{R}^2$ into unit-norm query and document vectors in $\mathbb{R}^3$, i.e., the transformed vectors are mapped on the surface of the unit sphere in $\mathbb{R}^3$.

To simplify the notation the bar symbol from the embeddings is dropped: $\overline{\psi} \to \psi$ and $\overline{\phi} \to \phi$, and it is assumed that the learned function $\mathcal{L}$ encodes queries and documents directly in $\mathbb{R}^{l+1}$ by also applying the above transformation.

Nearest Neighbor Queries and Metric Distances

Let $\delta$ be a metric distance function, $\delta: \mathbb{R}^{l+1} \times \mathbb{R}^{l+1} \to \mathbb{R}$, measuring the Euclidean distance between two embeddings $\mathbb{R}^{l+1}$ of valid documents and queries; the smaller the distance between the embeddings, the more similar the corresponding documents or queries are.

Given a query $q_a$, retrieve $NN(q_a, k)$, i.e., the k Nearest Neighbor documents to $q_a$ query according to the distance function $\delta(\cdot,\cdot)$. In the metric space $\mathbb{R}^{l+1}$, $NN(q_a, k)$ identifies an hyperball $\mathcal{B}_a$ centered on $\psi_a = \mathcal{L}(q_a)$ and with radius $r_a$, computed as:

$$r_a = \max_{d_i \in NN(q_a, k)} \delta(\psi_a, \mathcal{L}(d_i)) \qquad \text{Eq. 2}$$

The radius $r_a$ is thus the distance from $q_a$ of the least similar document among the ones in $NN(q_a, k)$. (Without loss of generality, it is assumed that the least similar document is unique, and furthermore that there are not two or more documents at distance $r_a$ from $q_a$.)

Figure 3:
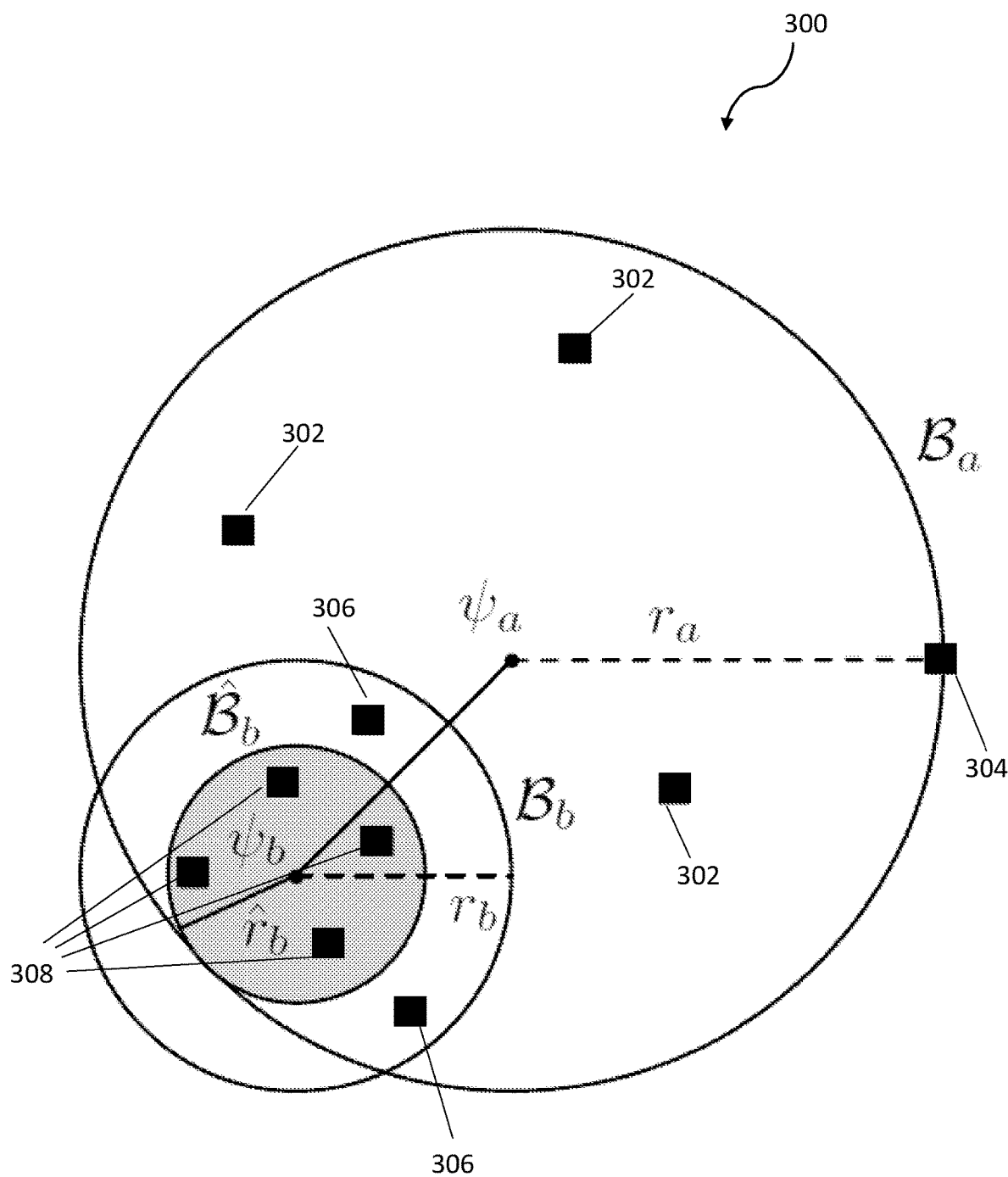
FIG. 3 illustrates overlapping hyperballs with embeddings.

A new query $q_b$ may now be introduced. Analogously, the set $NN(q_b, k)$ identifies the hyperball $\mathcal{B}_b$ with radius $r_b$ centered in $\psi_b$ and including the k embeddings closest to $\psi_b$. If $\psi_a \neq \psi_b$, the two hyperballs can be completely disjoint, or may partially overlap. Now the quantity:

$$\hat{r}_b = r_a - \delta(\psi_a, \psi_b) \qquad \text{Eq. 3}$$

may be introduced to detect the case of a partial overlap in which the query embedding $\psi_b$ falls within the hyperball $\mathcal{B}_a$, i.e., $\delta(\psi_a, \psi_b) < r_a$, or, equivalently, $\hat{r}_b > 0$, as illustrated in FIG. 3.

FIG. 3 illustrates a set of hyperballs $\mathcal{B}_a$, $\mathcal{B}_b$, and $\hat{\mathcal{B}}_b$ for queries in the embedding space 300. Each hyperball is centered on the appropriate query $\psi_a$ or $\psi_b$ with a radius of $r_a$, $r_b$, or $\hat{r}_b$. The black squares 302, 304, 306, and 308 each represent an embedding of a document found in the search. The hyperball $\mathcal{B}_a$ contains all the document embeddings 302, 304, 306, and 308 in this example. Thus, all the documents 302, 304, 306, and 308 would be returned in the search results for the query $\psi_a$. The least similar document 304 to the query of $\psi_a$ is shown on the circumference of the hyperball $\mathcal{B}_a$. The documents labeled as 302 are contained within the hyperball $\mathcal{B}_a$ not on the edges and also not contained within the other hyperballs $\mathcal{B}_b$ or $\hat{\mathcal{B}}_b$. Some documents 306 are contained within the hyperball $\mathcal{B}_b$ and other documents 308 within the hyperball $\hat{\mathcal{B}}_b$. (Note that FIG. 3 approximates the metric properties in a local neighborhood of $\psi_a$ on the (l+1)-dimensional unit sphere, i.e., in its locally-Euclidean l-dimensional tangent plane.)

In this case, there always exists a hyperball $\hat{\mathcal{B}}_b$, centered on $\psi_b$ with radius $\hat{r}_b$ such that $\hat{\mathcal{B}}_b \subset \mathcal{B}_a$. As shown in FIG. 3, some of the documents 302, 304, 306, and 308 in $NN(q_a, k)$, retrieved for query $q_a$, may belong also to $NN(q_b, k)$ (e.g., documents 308 contained within hyperball $\hat{\mathcal{B}}_b$.) Specifically, these documents 308 are all those within the hyperball $\hat{\mathcal{B}}_b$. Note that there can be other documents in $\mathcal{B}_a$ whose embeddings are contained in $\mathcal{B}_b$ (e.g., documents 306 contained within hyperball $\mathcal{B}_b$), but if such embeddings are in $\hat{\mathcal{B}}_b$, then it is guaranteed to follow that the corresponding documents are the most similar to $q_b$ among all the documents in $\mathcal{D}$. Thus, any documents 308, which are contained by hyperball $\mathcal{B}_b$, centered on $\psi_b$, with radius $\hat{r}_b < r_b$, must be closer to the center ($\psi_b$) than the other documents in hyperball $\mathcal{B}_b$ (i.e., documents 306).

The results described elsewhere in this disclosure show that the documents relevant for successive queries in a conversation overlap significantly. To take advantage of such overlap, a cache for storing historical embeddings is now introduced that exploits the above metric properties of dense representations of queries and documents. Given the representation of the current utterance, the proposed cache aims at reusing the embeddings already retrieved for previous utterances of the same conversation for improving the responsiveness of the system. In the simplistic example depicted in FIG. 3, the cache would answer query $q_b$ by reusing the embeddings in $\mathcal{B}_b$ already retrieved for $q_a$.

A Metric Cache for Conversational Search

Since several queries in a multi-turn conversation may deal with the same broad topic, documents retrieved for the starting topic of a conversation might become useful also for answering subsequent queries within the same conversation. The properties of nearest neighbor queries in metric spaces discussed in the previous subsection suggest a simple, but effective way to exploit temporal locality using a metric cache $\mathcal{C}$ deployed on the client-side of a conversational DR system.

The system for CAChing Historical Embeddings (CACHE) is specified in Process 1, depicted in FIG. 4. The system receives a sequence of queries belonging to a user conversation and answers them returning k documents retrieved from the metric cache $\mathcal{C}$ or the metric index $\mathcal{M}$ containing the document embeddings of the whole collection. When the conversation is initiated with a query q, whose embedding is $\psi$, the cache is empty (line 1 of Process 1). The main index $\mathcal{M}$, possibly stored on a remote backend server, is thus queried for top $NN(\mathcal{M}, \psi, k_c)$ documents, with cache cutoff $k_c \gg k$ (line 2). Those $k_c$ documents are then stored in the cache (line 3). The rationale of using a cache cutoff $k_c$ much larger than the query cutoff k is that of filling the cache with documents that are likely to be relevant also for the successive queries of the conversation, i.e., possibly all the documents in the conversation clusters depicted in FIG. 1. The cache cutoff $k_c$ relates in fact with the radius $r_a$ of the hyperball $\mathcal{B}_a$ illustrated in FIG. 3: the larger $k_c$ the larger $r_a$ and the possibility of having documents relevant to the successive queries of the conversation in the hyperball $\mathcal{B}_a$. When a new query of the same conversation arrives, the quality of the historical embeddings stored in the cache for answering it is estimated. This is accomplished by the function LowQuality ($\psi, \mathcal{C}$) (line 1). If the results available in the cache $\mathcal{C}$ are likely to be of low quality, the query is issued to the main index $\mathcal{M}$ with cache cutoff $k_c$ and adds the top $k_c$ results to $\mathcal{C}$ (line 2-3). Eventually, the cache is queried for the k nearest neighbor documents (line 4), and return them (line 5).

Cache quality estimation. The quality of the historical embeddings stored in $\mathcal{C}$ for answering a new query is estimated heuristically within the function LowQuality($\psi$, $\mathcal{C}$) called in line 1 of Process 1 (see FIG. 4). Given the embedding of the new query, the query embedding $\psi_a$ closest to $\psi$ among the ones present in $\mathcal{C}$, is first identified, i.e., $$\psi_a = \underset{\psi_i \in C}{\mathrm{argmin}} \delta(\psi_i, \psi) \qquad \text{Eq. 4}$$

Once $\psi_a$ is identified, the radius $r_a$ of the hyperball $\mathcal{B}_a$, depicted in FIG. 3, is considered and Eq. 3 is used to check if $\psi$ falls within $\mathcal{B}_a$. If this happens, it is likely that some of the documents previously retrieved for $\psi_a$ and stored in $\mathcal{C}$ are relevant even for $\psi$. Specifically, the quality estimation heuristics considers the value $\hat{r}=r_a-\delta(\psi_a, \psi_i)$ introduced in Eq. 3. If $\hat{r} > \epsilon$, with $\epsilon \geq 0$ being a hyperparameter of the cache, $\psi$ is answered with the k nearest neighbor documents stored in the cache, i.e., the NN($\mathcal{C}$, $\psi$, k) documents; otherwise, the main embedding index in the conversational search back-end is queried and the cache is updated accordingly. This quality test has the advantage of efficiency; it simply requires computing the distances between $\psi$ and the embeddings of the few queries previously used to populate the cache for the current conversation, i.e., the ones that caused a cache miss and were answered by retrieving the embeddings from the back-end (lines 2 and 3 of Process 1 in FIG. 4).

In addition, by changing the single hyperparameter E that measures the distance of a query from the internal border of the hyperball containing the closest cached query, the quality-assessment heuristic for the specific needs can be easily tuned. In the experimental results section of this disclosure, a simple but effective technique for tuning $\epsilon$ to balance the effectiveness of the results returned is proposed and discussed and the efficiency improvement with caching is introduced.

The research questions and the experimental setup aimed at evaluating the proposed CACHE system in operational scenarios is now presented. That is, both the accuracy, namely not hindering response quality, and efficiency, namely a reduction of index request time, of a conversational search system that includes CACHE are assessed. The reference baseline is exactly the same conversational search system illustrated in FIG. 2 where conversational clients always forward the queries to the back-end server managing the document embedding index.

Example Embodiments

In an embodiment, the conversational search system may use STAR to encode CAsT queries and documents as embeddings with 769 dimensions. (STAR encoding uses 768 values but one dimension is added to each embedding by applying the transformation in Eq. 1.) The document embeddings may be stored in a dense retrieval system leveraging the FAISS library to efficiently perform similarity searches between queries and documents. The nearest neighbor search is exact, and no approximation/quantization mechanisms are deployed.

Datasets and dense representation. The experimental evaluations of the system and method described below are based on the resources provided by the 2019, 2020, and 2021 editions of the TREC Conversational Assistance Track (CAsT). The CAsT 2019 dataset consists of 50 human-assessed conversations, while the other two datasets include 25 conversations each, with an average of 10 turns per conversation. The CAsT 2019 and 2020 include relevance judgements at passage level, whereas for CAsT 2021 the relevance judgments are provided at the document level. The judgments, graded on a three-point scale, refer to passages of the TREC CAR (Complex Answer Retrieval), and MS-MARCO (MAchine Reading COmprehension) collections for CAsT 2019 and 2020, and to documents of MS-MARCO, KILT, Wikipedia, and Washington Post 2020 for CAsT 20214.

Regarding the dense representation of queries and passages/documents, the caching strategy is orthogonal with respect to the choice of the embedding. The state-of-the-art single-representation models proposed in the literature are: DPR, ANCE, and STAR. The main difference among these models is how the fine-tuning of the underlying pre-trained language model, i.e., BERT, is carried out. The embeddings computed by the STAR model were selected for the experiments since that model employs hard negative sampling during fine-tuning, obtaining better representations in terms of effectiveness with respect to ANCE and DPR. For CAsT 2019 and 2020, a STAR embedding was generated for each passage in the collections, while for CAsT 2021, each document was encoded, up to the maximum input length of 512 tokens, in a single STAR embedding.

Given the focus on the efficiency of conversational search, strictly manually rewritten queries were used in these embodiments and tests. Missing keywords or mentions to previous subjects, e.g., pronouns, were resolved in these tests by human assessors.

CACHE Configurations. The end-to-end performance of the proposed CACHE system on the three CAsT datasets was measured. CACHE was compared against the efficiency and effectiveness of a baseline conversational search system with no caching, always answering the conversational queries by using the FAISS index hosted by the back-end (hereinafter indicated as no-caching). The effectiveness of no-caching on the assessed conversations of the three CAsT datasets represents an upper bound for the effectiveness of the CACHE system. Analogously, the no-caching baseline always retrieving documents via the back-end is considered as a lower bound for the responsiveness of the conversational search task addressed.

Two different embodiments of the CACHE system were evaluated:

a static-CACHE: a metric cache populated with the $k_c$ nearest documents returned by the index for the first query of each conversation and never updated for the remaining queries of the conversations;

a dynamic-CACHE: a metric cache updated at query processing time according to Alg. 1, where LowQuality($\psi_b$, $\mathcal{C}$) returns false if $\hat{r}_b \geq \epsilon$ (see Eq. 3) for at least one of the previously cached queries, and true otherwise.

The cache cutoff $k_c$ is varied in {1K, 2K, 5K, 10K} to assess the impact of the number of documents in the cache. Additionally, since conversations are typically brief, (e.g., from 6 to 13 queries for the three CAsT datasets considered) for efficiency and simplicity of design, no space-freeing, eviction policy was implemented should the client-side cache reach maximum capacity. Even without eviction, the amount of memory needed by the dynamic-CACHE to store the embeddings of the documents retrieved from the FAISS index during a single conversation sufficed and presented no issues. In addition to the document embeddings, to implement the LowQuality(•,•) function test, the cache records also the embeddings $\psi_a$ (the first query) and radius $r_a$ (the distance in embedding space between the first query and the least similar of the $k_c$ cached documents) of all the previous queries $q_a$ of the conversation answered on the back-end.

Effectiveness Evaluation. The effectiveness of the no-caching system, the static-CACHE, and the dynamic-CACHE were assessed by using the official metrics used to evaluate CAsT conversational search systems: mean average precision at query cutoff 200 (MAP@200), mean reciprocal rank at query cutoff 200 (MRR@200), normalized discounted cumulative gain at query cutoff 3 (nDCG@3), and precision at query cutoffs 1 and 3 (P@1, P@3). Other evaluation metrics known in the art are likewise within scope of this invention. The experiments report statistically significant differences with respect to the baseline system for p<0.01 according to the two-sample t-test. In addition to these standard Information Retrieval (IR) measures, a new metric is introduced to measure the quality of the approximate answers retrieved from the cache with respect to the correct results retrieved form the FAISS index. The coverage of a query q with respect to a cache $\mathcal{C}$ and a given query cutoff value k, is defined as the intersection, in terms of nearest neighbor documents, between the top k elements retrieved for the cache $\mathcal{C}$ and the exact top k elements retrieved from the whole index divided by k $$\text{cov}_k(q) = \frac{|NN(\mathcal{C}, \psi, k) \cap NN(\mathcal{M}, \psi, k)|}{k} \qquad \text{Eq. 5}$$

where $\psi$ is the embedding of query q. The quality of the approximate answers retrieved from the cache by measuring the coverage $\text{cov}_k$, averaged over the different queries is reported. The higher $\text{cov}_k$ at a given query cutoff k is, the greater is the quality of the approximate k nearest neighbor documents retrieved from the cache. Of course, $\text{cov}_k(q)=1$ for a given cutoff k and query q means that exactly the same set of answers is retrieved from the cache or the main index. Moreover, these answers come out to be ranked in the same order by the distance function adopted. Besides measuring the quality of the answers retrieved from the cache versus the main index, the metric $\text{cov}_k$ is also used to tune the hyperparameter $\epsilon$.

Figure 5:
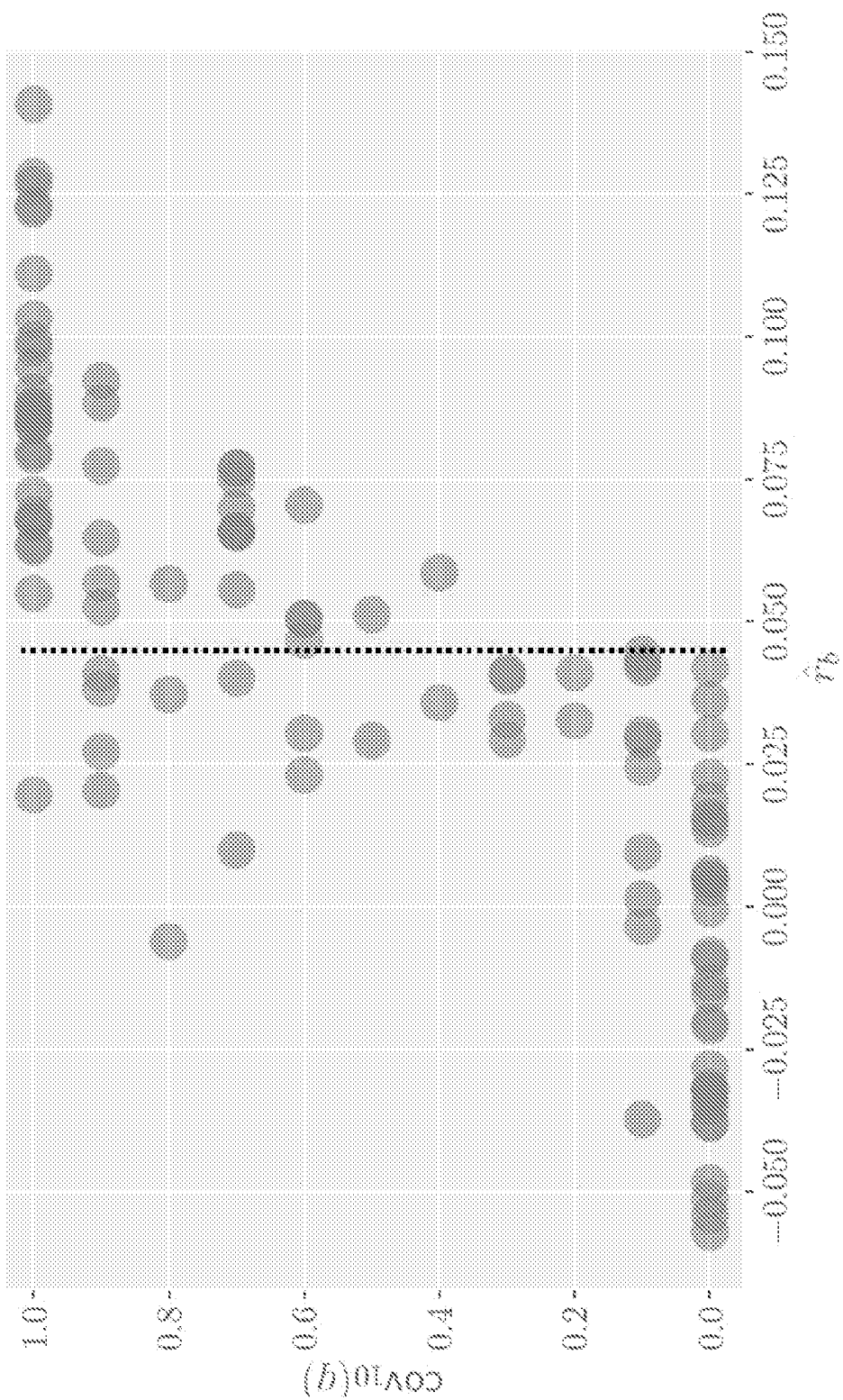
FIG. 5 illustrates a correlation between $\hat{r}_b$, vs. $\text{cov}_{10}(q)$ for some queries.

To this end, FIG. 5 reports the correlation between $\hat{r}_b$, vs. $\text{cov}_{10}$ (q) for the CAsT 2019 train queries, using static-CACHE with k=10 and $k_c$=1K. The dashed line at $\hat{r}_b$=0.04 corresponds to the tuned cache update threshold value (the hyperparameter) used in the experiments. The queries with $\text{cov}_{10} \leq 0.3$, i.e., those with no more than three documents in the intersection between the static-CACHE contents and their actual top 10 documents, correspond to $\hat{r}_b \leq 0.04$. Hence, in the initial experiments, the value of $\epsilon$ is set to 0.04 to obtain good coverage figures at small query cutoffs. In answering RQ1. A a different tuning of $\epsilon$ aimed at improving the effectiveness of dynamic-CACHE at large query cutoffs will also be discussed.

Efficiency Evaluation. The efficiency of the CACHE systems may be measured in terms of: i) hit rate, i.e., the percentage of queries, over the total number of queries, answered directly by the cache without querying the dense index; ii) average query response time for the CACHE configurations and the no-caching baseline. The hit rate may be measured by not considering the first query in each conversation since each conversation starts with an empty cache, and the first queries are thus compulsory cache misses, always answered by the index. Finally, the query response time, namely latency, is measured as the amount of time from when a query is submitted to the system to the time it takes for the response to get back. To better understand the impact of caching, for CACHE the average response time for hits and misses are measured separately. The efficiency evaluation in this example was conducted on a server equipped with an Intel Xeon E5-2630 v3 CPU clocked at 2.40 GHz and 192 GiB of RAM. In the tests, the FAISS Python API v1.6.4 is employed. The evaluations of this embodiment measuring query response time were conducted by using the low-level C++ exhaustive nearest-neighbor search FAISS APIs. This choice avoids possible overheads introduced by the Python interpreter which may come into play when using the standard FAISS high-level APIs. Moreover, as FAISS is a library designed and optimized for batch retrieval, the efficiency evaluations were conducted by retrieving results for a batch of queries instead of a single one. The rationale of this choice assumes that, on a back-end level, queries coming from different clients can be batched together before being submitted to FAISS. The reported response times were obtained as an average of three different runs.

Results: Effectiveness of Cached Answers to Queries

The results of the experiments conducted on the three CAsT datasets with the no-caching baseline, static-CACHE, and dynamic-CACHE are reported in Table 1. For each dataset, the static, and dynamic versions of CACHE, the value of the cache cutoff $k_c$ is varied as discussed in below and the symbol ▼ highlights the statistically significant differences (two-sample t-test with p<0.01) with respect to the no-caching baseline. The best results for each dataset and effectiveness metric are shown in bold.

TABLE 1

Retrieval performance measured on CAsT datasets with or without document embedding caching.

| | | $k_c$ | MAP@200 | MRR@200 | nDCG@3 | P@1 | P@3 | $\text{cov}_{10}$ | Hit Rate |
|---|---|---|---|---|---|---|---|---|---|
| CAsT 2019 | no-caching | — | 0.194 | 0.647 | 0.376 | 0.497 | 0.495 | — | — |
| | static-CACHE | 1K | 0.101▼ | 0.507▼ | 0.269▼ | 0.387▼ | 0.364▼ | 0.40 | 100% |
| | | 2K | 0.112▼ | 0.567▼ | 0.304▼ | 0.428 | 0.414▼ | 0.47 | 100% |
| | | 5K | 0.129▼ | 0.588 | 0.316▼ | 0.451 | 0.426 | 0.56 | 100% |
| | | 10K | 0.140▼ | 0.611 | 0.338 | 0.486 | 0.459 | 0.62 | 100% |
| | dynamic-CACHE | 1K | 0.180▼ | 0.634 | 0.365 | 0.474 | 0.482 | 0.91 | 67.82% |
| | | 2K | 0.183▼ | 0.631 | 0.366 | 0.480 | 0.487 | 0.93 | 70.69% |
| | | 5K | 0.186▼ | 0.652 | 0.375 | 0.503 | 0.499 | 0.94 | 74.14% |
| | | 10K | 0.190 | 0.655 | 0.380 | 0.509 | 0.505 | 0.96 | 75.29% |

TABLE 1-continued

Retrieval performance measured on CAsT datasets with or without document embedding caching.

| | | $k_c$ | MAP@200 | MRR@200 | nDCG@3 | P@1 | P@3 | $cov_{10}$ | Hit Rate |
|---|---|---|---|---|---|---|---|---|---|
| CaST 2020 | no-caching | — | 0.212 | 0.622 | 0.338 | 0.471 | 0.473 | — | — |
| | static-CACHE | 1K | 0.112▼ | 0.421▼ | 0.215▼ | 0.312▼ | 0.306▼ | 0.35 | 100% |
| | | 2K | 0.120▼ | 0.454▼ | 0.236▼ | 0.351▼ | 0.324▼ | 0.41 | 100% |
| | | 5K | 0.139▼ | 0.509▼ | 0.267▼ | 0.394 | 0.370▼ | 0.48 | 100% |
| | | 10K | 0.146▼ | 0.518▼ | 0.270▼ | 0.394▼ | 0.380▼ | 0.52 | 100% |
| | dynamic-CACHE | 1K | 0.204 | 0.624 | 0.339 | 0.481 | 0.478 | 0.91 | 56.02% |
| | | 2K | 0.203 | 0.625 | 0.336 | 0.481 | 0.470 | 0.93 | 60.73% |
| | | 5K | 0.208 | 0.622 | 0.341 | 0.476 | 0.479 | 0.94 | 62.83% |
| | | 10K | 0.210 | 0.625 | 0.339 | 0.476 | 0.476 | 0.96 | 63.87% |
| CaST 2021 | no-caching | — | 0.109 | 0.584 | 0.340 | 0.449 | 0.411 | — | — |
| | static-CACHE | 1K | 0.068▼ | 0.430▼ | 0.226▼ | 0.323▼ | 0.283▼ | 0.38 | 100% |
| | | 2K | 0.072▼ | 0.461▼ | 0.240▼ | 0.348▼ | 0.300▼ | 0.42 | 100% |
| | | 5K | 0.079▼ | 0.508▼ | 0.270▼ | 0.386 | 0.338▼ | 0.51 | 100% |
| | | 10K | 0.080▼ | 0.503▼ | 0.272▼ | 0.367▼7 | 0.338▼ | 0.56 | 100% |
| | dynamic-CACHE | 1K | 0.106 | 0.577 | 0.335 | 0.443 | 0.409 | 0.89 | 61.97% |
| | | 2K | 0.107 | 0.585 | 0.338 | 0.456 | 0.411 | 0.91 | 63.38% |
| | | 5K | 0.106 | 0.584 | 0.334 | 0.449 | 0.407 | 0.92 | 66.67% |
| | | 10K | 0.107 | 0.584 | 0.336 | 0.449 | 0.409 | 0.94 | 67.61% |

The symbol ▼ highlights the statistically significant differences with respect to no-caching for p < 0.01 according to the two-sample t-test. Best values for each dataset and metric are shown in bold.

By looking at the figures in the table, it is seen that static-CACHE returns worse results than no-caching for all the datasets, most of the metrics, and cache cutoffs $k_c$ considered. However, in a few cases, the differences are not statistically significant. For example, the static-CACHE on CAsT 2019 with $k_c$=10k does not statistically differ from no-caching for all metrics but MAP@200. The reuse of the embeddings retrieved for the first queries of CAsT 2019 conversations is thus so high that even the simple heuristic of statically caching the top 10k embeddings of the first query allows the cache to answer effectively the following queries without further interactions with the back-end. As expected, by increasing the number $k_c$ of statically cached embeddings from 1K to 10K, the quality for all datasets and metrics is improved. Interestingly, the static-CACHE performs relatively better at small query cutoffs since in column P@1, for 5 times out of 12, the results are not statistically different from those of no-caching. Such behavior is explained by observing again FIG. 3: when an incoming query $q_b$ is close to a previously cached one, i.e., $\hat{r}_b \geq 0$, it is likely that the relevant documents for $q_b$ present in the cache are those most similar to $q_b$ among all those in D. The larger is query cutoff k, the lower is the probability of the least similar documents among the ones in NN($q_b$, k) residing in the cache.

When considering dynamic-CACHE, based on the heuristic update policy discussed earlier, effectiveness improves remarkably. Independently of the dataset and the value of $k_c$, performance figures are achieved that are not statistically different from those measured with no-caching for all metrics but MAP@200. Indeed, the metrics measured at small query cutoffs result in some cases to be even slightly better than those of the baseline even if the improvements are not statistically significant: since the embeddings relevant for a conversation are tightly clustered, retrieving them from the cache rather than from the whole index in some case reduces noise and provides higher accuracy. MAP@200 is the only metric for which some configurations of dynamic-CACHE perform worse than no-caching. This is motivated by the tuning of threshold ∈ performed by focusing on small query cutoffs, i.e., the ones commonly considered important for conversational search tasks.

Effectiveness of the quality assessment heuristic. The performance exhibited by dynamic-CACHE demonstrates that the quality assessment heuristic used to determine cache updates is highly effective. To further corroborate this claim, the $cov_{10}$ column of Table 1 reports for static-CACHE and dynamic-CACHE the mean coverage for k=10 measured by averaging Eq. (5) over all the conversational queries in the datasets. This measure counts the cardinality of the intersection between the top 10 elements retrieved from the cache and the exact top 10 elements retrieved from the whole index, divided by 10. The $cov_{10}$ values for static-CACHE ranged between 0.35 to 0.62, justifying the quality degradation captured by the metrics reported in the table. With dynamic-CACHE values between 0.89 and 0.96 were measured, showing that, consistently across different datasets and cache configurations, the update heuristics proposed successfully trigger when the content of the cache needs refreshing to answer a new topic introduced in the conversation.

Other experimental evaluations of these systems and methods were conducted aimed at understanding if the hyperparameter E driving the dynamic-CACHE updates can be fine-tuned for a specific query cutoff. The investigation is motivated by the MAP@200 results reported in Table 1 which are slightly lower than the baseline for 5 out of the 12 dynamic-CACHE configurations. Tuning the value of E to achieve MAP@200 results statistically equivalent to those of no-caching enabled retention of the efficiency advantages of the client-side cache.

Figure 6:
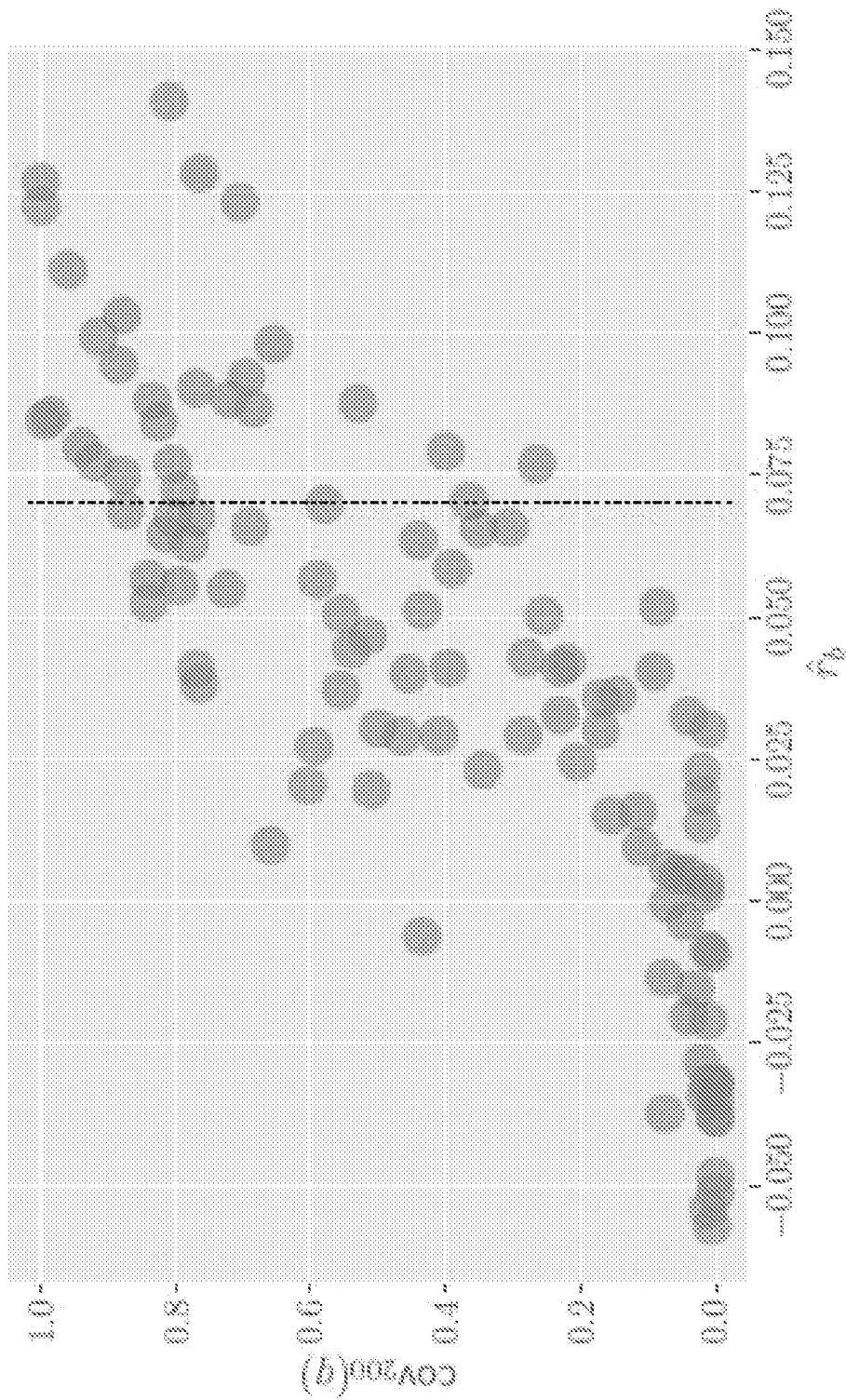
FIG. 6 illustrates a correlation between $\hat{r}_b$, vs. $\text{cov}_{200}(q)$ for some queries.

Similar to FIG. 5, the plot in FIG. 6 shows the correlation between the value of 4 vs. $cov_{200}$(q) for the CAsT 2019 train queries with static-CACHE, k=200 and $k_c$=1K. The vertical dashed line at $\hat{r}_b$=0.07 was selected for the case of the hyperparameter ∈ (the tuned cache updated threshold value) and was used in the experiments. Even at query cutoff 200, a strong correlation is observed between $\hat{r}_b$, and the coverage metrics of Eq. 5: most of the train queries with coverage $cov_{200} \leq 0.3$ have a value of $\hat{r}_b$, smaller than 0.07, with a single query for which this rule of thumb does not strictly hold. Hence, running the evaluations again with ∈=0.07 with dynamic-CACHE by varying the cache cutoff $k_c$ in {1k, 2k, 5k, 10k}. The results of these experiments, conducted with the CAsT 2019 dataset, are reported in Table 2. From the values reported in the table, increasing from 0.04 to 0.07 the value of $\epsilon$ improves the quality of the results returned by the cache at large cutoffs. Now dynamic-CACHE returns results that are always, even for MAP@200, statistically equivalent to the ones retrieved from the whole index by the no-caching baseline (according to a two-sample t-test for p<0.01). The improved quality at cutoff 200 is of course paid with a decrease in efficiency. While for $\epsilon$=0.04 (see Table 1) CAsT 2019 hit rates were measured ranging from 67.82 to 75.29, by setting $\epsilon$=0.07 the constraint on cache content quality is strengthened and correspondingly the number of cache updates performed is increased. Consequently, the hit rate now ranges from 46.55 to 58.05, demonstrating a strong efficiency boost with respect to the no-caching baseline.

TABLE 2

Retrieval performance on CAsT 2019 of the no-caching baseline and dynamic-CACHE with $\epsilon$ = 0.07.

| | $k_C$ | MAP@200 | MRR@200 | nDCG@3 | P@1 | P@3 | cov$_{200}$ | Hit Rate |
|---|---|---|---|---|---|---|---|---|
| no-caching | — | 0.194 | 0.647 | 0.376 | 0.497 | 0.495 | — | — |
| dynamic-CACHE | 1K | 0.193 | 0.645 | 0.374 | 0.497 | 0.491 | 0.83 | 46.55% |
| | 2K | 0.193 | 0.644 | 0.375 | 0.497 | 0.493 | 0.91 | 51.15% |
| | 5K | 0.194 | 0.645 | 0.375 | 0.497 | 0.493 | 0.93 | 54.02% |
| | 10K | 0.194 | 0.648 | 0.375 | 0.497 | 0.493 | 0.94 | 58.05% |

The last column of Table 1 reports the cache hit rate, i.e., the percentage of conversational queries over the total answered with the cached embeddings without interacting with the conversational search back-end. Of course, static-CACHE results in a trivial 100% hit rate since all the queries in a conversation are answered with the embeddings initially retrieved for answering the first query. The lowest possible workload on the back-end is however paid with a significant performance drop with respect to the no-caching baseline. With dynamic-CACHE, instead, high hit rates are achieved with the optimal answer quality discussed earlier. As expected, the greater the value of $k_c$, the larger the number of cached embeddings and the higher the hit rate. With $k_c$=1K, hit rates range between 56.02% to 67.82%, meaning that, even with the lowest cache cutoff experimented, more than half of the conversation queries in the 3 datasets are answered directly by the cache, without forwarding the query to the back-end. For $k_c$=10K, the hit rate value is in the interval [63.87%-75.29%], with more than ¾ of the queries in the CAsT 2019 dataset answered directly by the cache. If the hit rate is considered as a measure correlated to the amount of temporal locality present in the CAsT conversations, then the highest locality present in the 2019 dataset is emphasized: on this dataset dynamic-CACHE with $k_c$=1K achieves a hit rate higher that the ones measured for $k_c$=10K configurations on CAsT 2020 and 2021.

Worst-case CACHE memory requirements. The memory occupancy of static-CACHE is limited, fixed, and known in advance. The worst-case amount of memory required by dynamic-CACHE depends instead on the value of $k_c$ and on the number of cache updates performed during a conversation. The parameter $k_c$ establishes the number of embeddings added to the cache after every cache miss. Limiting the value of $k_c$ can be necessary to respect memory constraints on the client hosting the cache. Anyway, the larger $k_c$ is, the greater the performance of dynamic-CACHE thanks to the increased likelihood that upcoming queries in the conversation will be answered directly, without querying the back-end index. In the experiments, $k_c$ was varied in {1K, 2K, 5K, 10K} always obtaining optimal retrieval performances thanks to the effectiveness and robustness of the cache-update heuristic.

Regarding the number of cache updates performed, the most difficult conversations for the caching strategy in the three CAsT datasets, namely topic 77, topic 104, and topic 117 for CAsT 2019, 2020, and 2021, respectively were considered as exemplary cases. These conversations require the highest number of cache updates: 6, 7, 6 for $k_c$=1K and 5, 6, 5 for $k_c$=10K, respectively. Consider topic 104 of CAsT 2020, the toughest conversation for the memory requirements of dynamic-CACHE. At its maximum occupancy, after the last cache update, the dynamic-CACHE system stores at most 8·1K+8≈8K embeddings for $k_c$=1K and 7·10K+7≈70K embeddings for $k_c$=10K. In fact, at a given time, dynamic-CACHE stores the $k_c$ embedding retrieved for the first query in the conversation plus $k_c$ new embeddings for every cache update performed. Indeed, the total number is lower due to the presence of embeddings retrieved multiple times from the index on the back-end. The actual number of cache embeddings for the case considered is 7.5K and 64K for $k_c$=1K and $k_c$=10K, respectively. Since each embedding is represented with 769 floating point values, the maximum memory occupation for the largest cache is 64K× 769×4 bytes 188 MB. Note that if, in the case of dynamic-CACHE, $k_c$=1K, achieving the same optimal performance of dynamic-CACHE, $k_c$=10K on CAsT 2020 topic 104, the maximum occupancy of the cache decreases dramatically to about 28 MB.

Time Savings for CACHE

Experiments on an embodiment of the system and method were first conducted to understand the impact of $k_c$ on the latency of nearest-neighbor queries performed on the remote back-end. To this end, only the retrieval time measured for answering a query on the remote index was considered. The costs of client-server communications were not considered. The aim is to understand if the value of $k_c$ impacts significantly or not the retrieval cost. In fact, when the first query in the conversation is answered or when the dynamic-CACHE performed an update of the cache in case of a miss (lines 1-3 of Process 1, shown in FIG. 4), a large set of $k_c$ embeddings was retrieved from the remote index to increase the likelihood of storing in the cache documents relevant for successive queries. However, the query cutoff k commonly used for answering conversational queries was very small, e.g., 1, 3, 5, and k<<$k_c$. The caching approach can improve efficiency only if the cost of retrieving from the remote index $k_c$ embeddings is comparable to that of retrieving a much smaller set of k elements. Otherwise, even if the number of accesses to the back-end is reduced remarkably, every retrieval of a large number of results for filling or updating the cache would jeopardize its efficiency benefits.

The experiment is conducted on the CAsT 2020 dataset by reporting the average latency (in msec.) of performing NN(q, $k_c$) queries on the remote index. Due to the peculiarities of the FAISS library implementation previously discussed, the response time is measured by retrieving the top-$k_c$ results for a batch of 216 queries, i.e., the CAsT 2020 test utterances, and by averaging the total response time (Table 3). Experimental results show that the back-end query response time was approximately 1 second and was almost unaffected by the value of $k_c$. These results were expected as an exhaustive nearest-neighbor search requires the computation of the distances from the query to all indexed documents, plus the negligible cost of maintaining the top-$k_c$ closest documents in a min-heap. The result thus confirms that large $k_c$ values do not jeopardize the efficiency of the whole system when cache misses occur.

TABLE 3

Average response time (msec.) for querying the
FAISS back-end (no-caching) or the static-CACHE
and dynamic-CACHE in case of a cache hit.

| | $k_c$ | | | |
|---|---|---|---|---|
| | 1K | 2K | 5K | 10K |
| no-caching | 1,060 | 1,058 | 1,061 | 1,073 |
| static-CACHE | 0.14 | 0.30 | 0.78 | 1.59 |
| dynamic-CACHE | 0.36 | 0.70 | 1.73 | 3.48 |

Query Retrieval for Local Cache Vs. Remote Index.

A second experimental evaluation conducted measured the average retrieval time for querying the client-side cache (line 4 of Process 1 in FIG. 4) in case of a hit. The experiment was run for the two caches proposed, i.e., static-CACHE and dynamic-CACHE. While the first one stored a fixed number of documents, the latter employed cache updates that added document embeddings to the cache during the conversation. The last two rows of Table 3 report the average response time of top-3 nearest-neighbor queries resulting in cache hits for different configurations of static-CACHE and dynamic-CACHE. As before, latencies were measured on batches of 216 queries, i.e., the CAsT 2020 test utterances, by averaging the total response time. The results of the experiment show that, in case of a hit, querying the cache requires on average less than 4 milliseconds, more than 250 times less than querying the back-end. Hit time increases linearly with the size of the static-CACHE. The dynamic-CACHE case showed slightly higher latency than the static-CACHE case. This discrepancy was due to the updates of the cache being performed during the conversation that added embeddings to the cache. The use of a cache in conversational search achieved a reduction in time of up to four orders of magnitude, i.e., from seconds to a few tenths of milliseconds, between querying a remote index and a local cache.

Assuming that the average conversation is composed of 10 utterances, the no-caching baseline that always queries the back-end leads to a total response time of about 10×1.06=10.6 seconds. Instead, with static-CACHE, only one retrieval from the remote index for the first utterance is performed while the remaining queries are resolved by the cache. Assuming the use of static-CACHE with 10K embeddings, i.e., the one with higher latency, the total response time for the whole conversation was 1.06+(9·0.00159)=1.074 seconds, with an overall speedup of about 9.87× over no-caching. Finally, the use of dynamic-CACHE implies possible cache updates that may increase the number of queries answered using the remote index. In detail, dynamic-CACHE with 10K embeddings obtained a hit rate of about 64% on CAsT 2020 (see Table 1). This means that, on average, 1+(9·0.36)=4.24 queries were forwarded to the back-end that cost in total 4.24·1.06=4.49 seconds. The remaining cost came from cache hits. The number of hits on average was 5.76 and required 5.76·0.00348=0.002 seconds accounting for a total response time for the whole conversation of 4.242 seconds. Thus, a speedup of 2.5 times with respect to the no-caching solution was demonstrated.

The above figures confirm the feasibility and the computational performance advantages of the client-server solution for caching historical embeddings for conversational search.

A client-side, document-embedding cache was introduced for expediting conversational search systems. Although caching is extensively used in search, a closer look was taken at how it can be effectively and efficiently exploited in a novel and challenging setting: a client-server conversational architecture exploiting state-of-the-art dense retrieval models and a novel metric cache hosted on the client-side.

Given the high temporal locality of the embeddings retrieved for answering utterances in a conversation, a cache can provide a great advantage to expedite conversational systems. Both queries and documents in a conversation were proven to lie close together in the embedding space and given this specific interaction and query properties, the metric properties of distance computations in a dense retrieval context can be exploited.

Two types of caching were proposed and the results were compared in terms of both effectiveness and efficiency with respect to a no-caching baseline using the same back-end search solution. The first is a static-CACHE which populates the cache with documents retrieved based on the first query of a conversation only. The second, dynamic-CACHE, proposes also an update mechanism that comes in place when it is determined, via a precise and efficient heuristic strategy, that the current contents of the cache might not provide relevant results.

The results of extensive and reproducible experiments conducted on CAsT datasets show that dynamic-CACHE achieves hit rates up to 75% with answers quality statistically equivalent to that of the no-caching baseline. In terms of efficiency, the response time varies with the size of the cache, nevertheless queries resulting in cache hits are three orders of magnitude faster than those processed on the back-end (accessed only for cache misses by dynamic-CACHE and for all queries by the no-caching baseline).

The CACHE solution described in this disclosure for conversational search is a viable and effective solution, also opening the door for significant further investigation. Its client-side organization permits, for example, to effectively integrate models of user-level contextual knowledge. Equally interesting is the investigation of user-level, personalized query rewriting strategies and neural representations.

Figure 7:
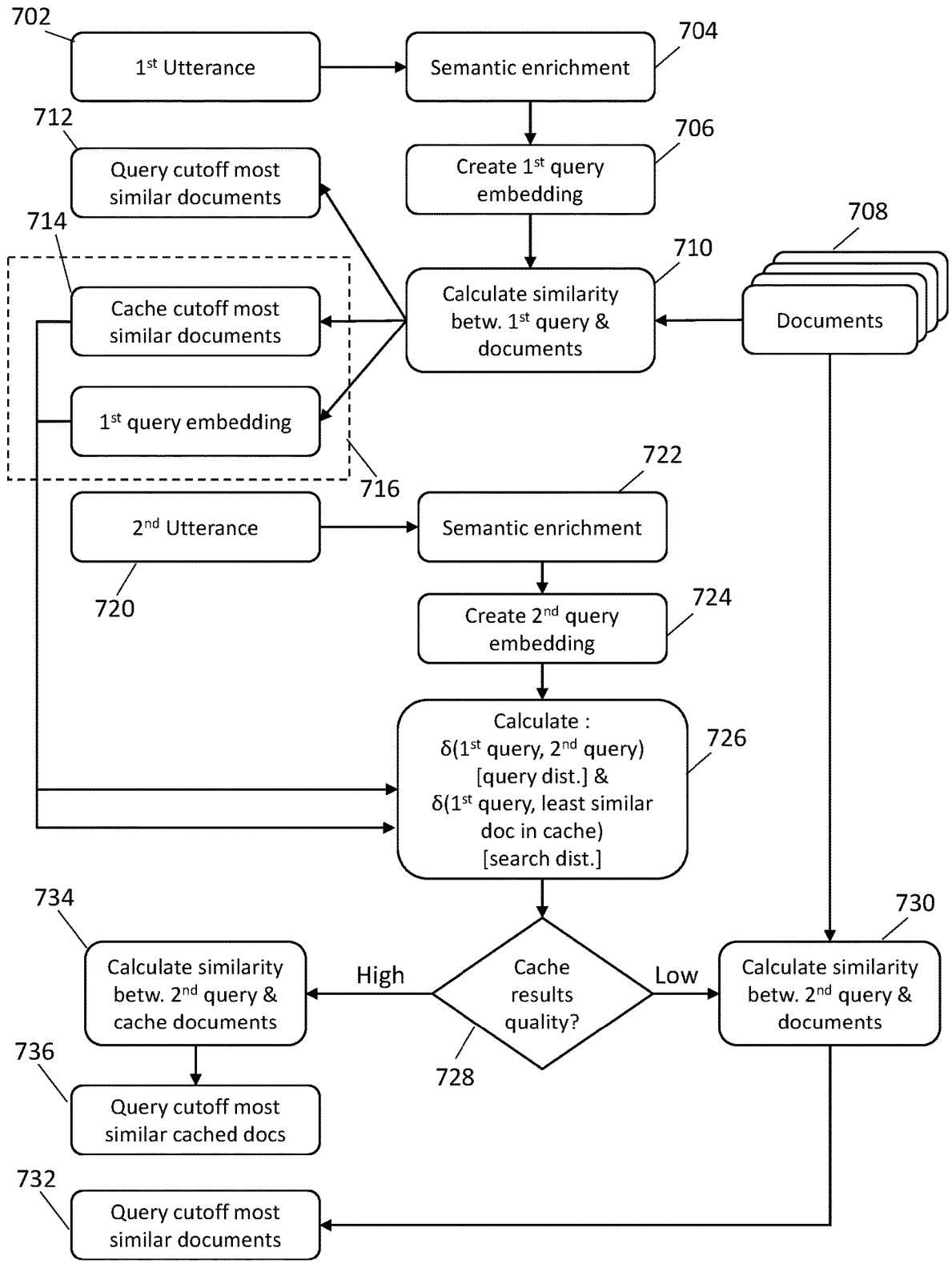
FIG. 7 illustrates a flow chart of the process.

FIG. 7 illustrates a flow chart of the entire process. A first utterance 702 is detected by a local device 204 and transmitted to a server 202 remote from the local device 204. In an embodiment, the local device 204 may also detect the second utterance and then transmit both the first utterance and the second utterance to the server together. At the server 202, the first utterance 702 may be semantically enriched 704. At the server 202, the second utterance 720 may be semantically enriched 722. In an embodiment, the local device 204 may also perform the semantic enrichment steps 704, 722. The semantically enriched first utterance may be turned into a first query in an embedding space 706. Many documents (e.g., web sites) may be accessed by the server 202 and turned into embeddings at 708. At step 710 a similarity between the first query 706 and the many document embeddings 708 is calculated. In addition, at step 710, after the similarity between the first query and the many documents has been calculated, each document may be ranked according to its similarity with the first query. The comparison further returns to the local device a query cutoff number of the most similar documents 712. In addition, the comparison step also returns to the local device the cache cutoff number for most similar documents 714, and stores the result in a cache 716 on the local device. The cache 716 further comprises the first query embedding, for easy retrieval later in the process. The second utterance 720 is detected at the local device and transmitted to the server 202. At the server 202, the second utterance 720 may be semantically enriched 722. (As noted above, the semantic enrichment step is optional and may take place at either the local device 204 or at the server 202.) Then a second query embedding may be created at step 724. Next, at step 726, two distances in embedding space may be calculated and compared, as noted in the discussion of equation 3 elsewhere in this disclosure. Briefly if $\delta(\psi_a, \psi_b) \leq r_a$ then the cached documents will yield high quality results on the second query. This result may be modified by the inclusion of a hyperparameter. The first distance in embedding space may be calculated between the first query and the second query and may be called the query distance. The query distance tells roughly how closely the second query is related to the first query. The second distance in embedding space may be called the search distance and may be calculated between the first query and the least similar document stored in the cache. The search distance tells roughly the breadth of coverage of the cached documents 714, which represent only a small fraction of all the available documents (as represented by the document embeddings 708). These two distances in embedding space may then be compared at step 728 to determine whether the cache results, when used in responding to the second query, produce low-quality results (the query distance is greater than the search distance) or high-quality results (the query distance is less than or equal to the search distance). If low quality results are obtained from the second query on the cached documents, then at step 730, the similarity between all the document embeddings 708 and the second query are calculated and the query cutoff number of most similar documents are returned to the local device at step 732. In the fork when low-quality results are returned from the second query applied to the cached documents, the documents stored in the cache 714 may be updated, replaced, or refreshed with additional documents. For example, documents which the second query returns but which were not included in the first query results may simply be added to the cached documents. In another embodiment, the cached documents 714 may be replaced entirely by the results from the new query. In other embodiments insertions of additional documents may also take place depending on other conditions, such as, for instance, always limiting the total number of documents to remain below the cache cutoff number. If high-quality results are obtained from the second query 724 on the cached documents 714, then the similarity between each of the cached documents with the second query may be calculated at step 724. At step 736, the query cutoff number of most similar documents from the cache are returned.

Computer Hardware

Figure 8:
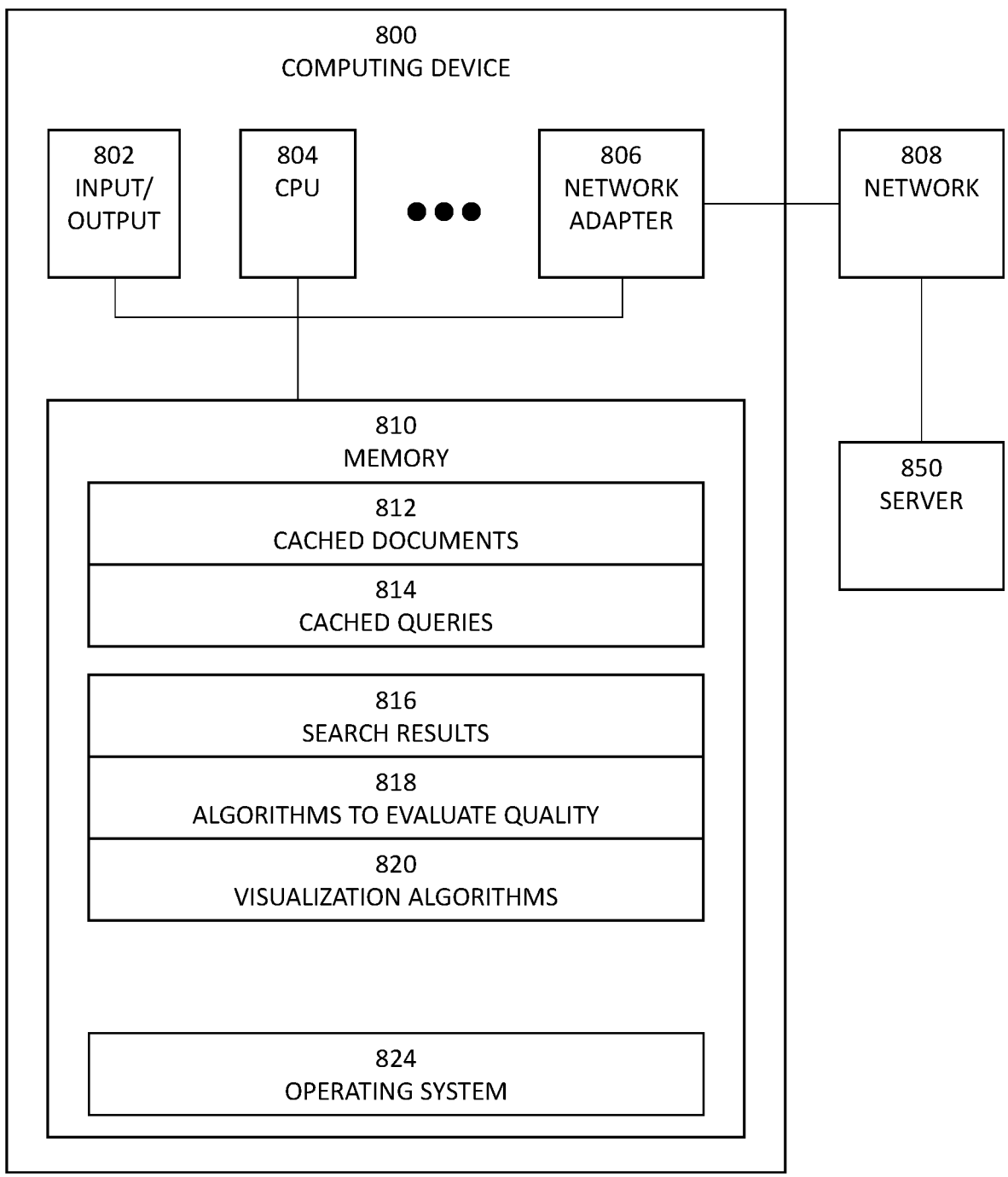
FIG. 8 illustrates an exemplary electronic computing device.

The computer or electronic computing devices and hardware are best understood in reference to FIG. 8. The present system may involve the use of remote servers which are accessible via a network 808 and in contact with a remote server 850, for instance, indexed search results for many documents stored in many locations. The user's electronic device 800 may comprise elements for input and output 802, such as a keyboard, a mouse, a microphone, a display, a speaker, a touchpad, and the like. The electronic computing device 800 may have a central processing unit 804, also known as a CPU 804. The device may have a network adapter 806 for connecting to the network 808. In the memory 810 or storage 810 of the computing device 800, there may reside algorithms and data. Amongst the algorithms and data stored in the memory 810 are cached documents 812 and cached queries 814. In addition, there may be search results 816, algorithms 818 to evaluate the quality of performing a search on the cached documents (e.g., LowQuality from algorithm 1 in FIG. 4). The memory 810 may also comprise visualization algorithms 820 (e.g., t-SNE algorithm results presented in FIG. 1.)

The present systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium 810 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network 808, for example, the Internet, a local area network, a wide area network and/or a wireless network. The network may comprise copper transmission cables, optical transmission fibers, wireless transmission, routers, firewalls, switches, gateway computers, and/or edge servers. A network adapter card 806 or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for improving the speed and efficiency of obtaining search results comprising the steps of:
   receiving a first utterance at a server;
   converting the first utterance into a first query in an embedding space;
   performing, at the server, a first conversational search by:
   comparing a first similarity of the first query with an embedding of each document of a plurality of documents;
   returning a cache cutoff number of documents ranked by the first similarity; and
   returning a query cutoff number of documents ranked by the first similarity;
   storing as a cache, on a local device, the first query and the cache cutoff number of documents ranked by the first similarity;
   receiving a second utterance at the server;

converting the second utterance into a second query in the embedding space;

determining, at the local device, using the second query and the cache whether the second query applied to the cache documents provides low quality results or high quality results;

if the second query applied to the cache provides low quality results, then performing a second conversational search on the server by:
- calculating a second similarity of the second query with an embedding of each document of the plurality of documents; and
- returning the query cutoff number of documents ranked by the second similarity;

if the second query applied to the cache provides high quality results, then performing, at the local device, the second conversational search by:
- calculating a second similarity of the second query with an embedding of each document of the cache; and
- returning the query cutoff number of documents ranked by the second similarity;

reporting the query cutoff number of documents ranked by the first similarity to the local device; and reporting the query cutoff number of documents ranked by the second similarity to the local device.

2. The method of claim 1, wherein the cache cutoff number is greater than the query cutoff number.

3. The method of claim 1, wherein the first utterance and the second utterance are semantically enriched by context prior to being converted into the first query and the second query.

4. The method of claim 1, wherein determining whether the second query applied to the cache provides low quality results or high-quality results comprises:
- determining a query distance in embedding space between the first query and the second query;
- determining a search distance in embedding space between the first query and the least similar document of the returned cache cutoff number of documents from the first conversational search; and
- comparing the query distance with the search distance:
  - if the query distance is less than or equal to the search distance, then the second query applied to the cache provides high quality results;
  - if the query distance is greater than the search distance, then the second query applied to the cache provides low quality results.

5. The method of claim 4, wherein comparing the query distance with the search distance further comprises:
- if the query distance plus a hyperparameter is less than or equal to the search distance, then the second query applied to the cache provides high quality results;
- if the query distance plus the hyperparameter is greater than the search distance, then the second query applied to the cache provides low quality results.

6. The method of claim 5, wherein the hyperparameter is selected based on a user preference.

7. The method of claim 1, wherein the second conversational search is optimized taking into account at least one of the following evaluation metrics: a hit rate, an average query response time, a mean average precision at query cutoff 200, a mean reciprocal rank at query cutoff 200, a normalized discounted cumulative gain at query cutoff 3, a precision at query cutoff 1, a precision at query cutoff 3, and a coverage of a query with respect to the local cache and the query cutoff number.

8. The method of claim 1, wherein the local device comprises at least one of a mobile phone, a smart speaker, an internet of things device, a personal computer, or a laptop computer.

9. A system for improving the speed and efficiency of obtaining search results comprising:
- a local device for receiving a first utterance and a second utterance and transmitting the first utterance and the second utterance to a server;
- the server and the local device to perform a method comprising:
  - converting, at the server, the first utterance into a first query in an embedding space;
  - performing, at the server, a first conversational search by:
    - comparing a first similarity of the first query with an embedding of each document of a plurality of documents;
    - returning a cache cutoff number of documents ranked by the first similarity; and
    - returning a query cutoff number of documents ranked by the first similarity;
  - storing as a cache, on the local device, the first query and the cache cutoff number of documents ranked by the first similarity;
  - converting, at the server, the second utterance into a second query in the embedding space;
  - determining, at the local device, using the second query and the cache whether the second query applied to the cache documents provides low-quality results or high-quality results;
  - if the second query applied to the cache provides low-quality results, then performing a second conversational search on the server by:
    - calculating a second similarity of the second query with an embedding of each document of the plurality of documents; and
    - returning the query cutoff number of documents ranked by the second similarity;
  - if the second query applied to the cache provides high-quality results, then performing, at the local device, the second conversational search by:
    - calculating a second similarity of the second query with an embedding of each document of the cache; and
    - returning the query cutoff number of documents ranked by the second similarity;
  - reporting the query cutoff number of documents ranked by the first similarity to the local device; and
  - reporting the query cutoff number of documents ranked by the second similarity to the local device.

10. The system of claim 9, wherein the cache cutoff number is greater than the query cutoff number.

11. The system of claim 9, wherein the first utterance and the second utterance are semantically enriched by context prior to being converted into the first query and the second query.

12. The system of claim 9, wherein determining whether the second query applied to the cache provides low-quality results or high-quality results comprises:
- determining a query distance in embedding space between the first query and the second query;
- determining a search distance in embedding space between the first query and the least similar document of the returned cache cutoff number of documents from the first conversational search; and
- comparing the query distance with the search distance:

if the query distance is less than or equal to the search distance, then the second query applied to the cache provides high-quality results;

if the query distance is greater than the search distance, then the second query applied to the cache provides low-quality results.

13. The system of claim 12, wherein comparing the query distance with the search distance further comprises:

if the query distance plus a hyperparameter is less than or equal to the search distance, then the second query applied to the cache provides high-quality results;

if the query distance plus the hyperparameter is greater than the search distance, then the second query applied to the cache provides low-quality results.

14. The system of claim 13, wherein the hyperparameter is selected based on a user preference.

15. The system of claim 9, wherein the second conversational search is optimized taking into account at least one of the following evaluation metrics: a hit rate, an average query response time, a mean average precision at query cutoff 200, a mean reciprocal rank at query cutoff 200, a normalized discounted cumulative gain at query cutoff 3, a precision at query cutoff 1, a precision at query cutoff 3, and a coverage of a query with respect to the local cache and the query cutoff number.

16. The system of claim 9, wherein the local device comprises at least one of a mobile phone, a smart speaker, an internet of things device, a personal computer, or a laptop computer.

* * * * *